United States Patent [19]

Yoshida et al.

[11] Patent Number: 4,618,146
[45] Date of Patent: Oct. 21, 1986

[54] VIDEO GAME APPARATUS ALLOWING FOR A VARIATION IN PLAYING SEQUENCE

[75] Inventors: Junichi Yoshida, Tokyo; Takashi Orimoto, Tokorozawa, both of Japan

[73] Assignee: Casio Computer Co., Ltd., Tokyo, Japan

[21] Appl. No.: 643,813

[22] Filed: Aug. 23, 1984

[30] Foreign Application Priority Data

Sep. 2, 1983 [JP] Japan ................................ 58-161620

[51] Int. Cl.$^4$ ............................................. A63F 9/22
[52] U.S. Cl. .................................. 273/1 E; 273/148 B
[58] Field of Search .................. 273/148 B, DIG. 28, 273/1 E, 85 G, 1 GC, 1 GE, 237, 238

[56] References Cited

U.S. PATENT DOCUMENTS

| 4,095,791 | 6/1978 | Smith et al. ................ 273/DIG. 28 |
| 4,179,124 | 12/1979 | Margolin . |
| 4,306,232 | 12/1981 | Burson ........................ 273/DIG. 28 |
| 4,324,401 | 4/1982 | Stubben et al. . |

FOREIGN PATENT DOCUMENTS

| 0085483 | 8/1983 | European Pat. Off. . |
| 83/02566 | 8/1983 | PCT Int'l Appl. . |
| 1472480 | 5/1977 | United Kingdom . |
| 2044122 | 10/1980 | United Kingdom . |
| 1600170 | 10/1981 | United Kingdom . |

Primary Examiner—Richard C. Pinkham
Assistant Examiner—MaryAnn Stoll Lastova
Attorney, Agent, or Firm—Frishauf, Holtz, Goodman & Woodward

[57] ABSTRACT

In a video game apparatus, a first joystick and a second joystick each contain a stick, a game start key and a mode select key. A control circuit controls the video game apparatus in the following manner. In a one-player mode as selected, only the output signal from the joystick whose start key is operated, is supplied to the main frame of the video game apparatus. In a two-player mode as selected, the output signal from the joystick whose start key is operated is supplied to the main frame. In turn, a game is started. With the progression of the game, the output signals from the first and second joysticks are alternately applied to the main frame.

5 Claims, 4 Drawing Figures

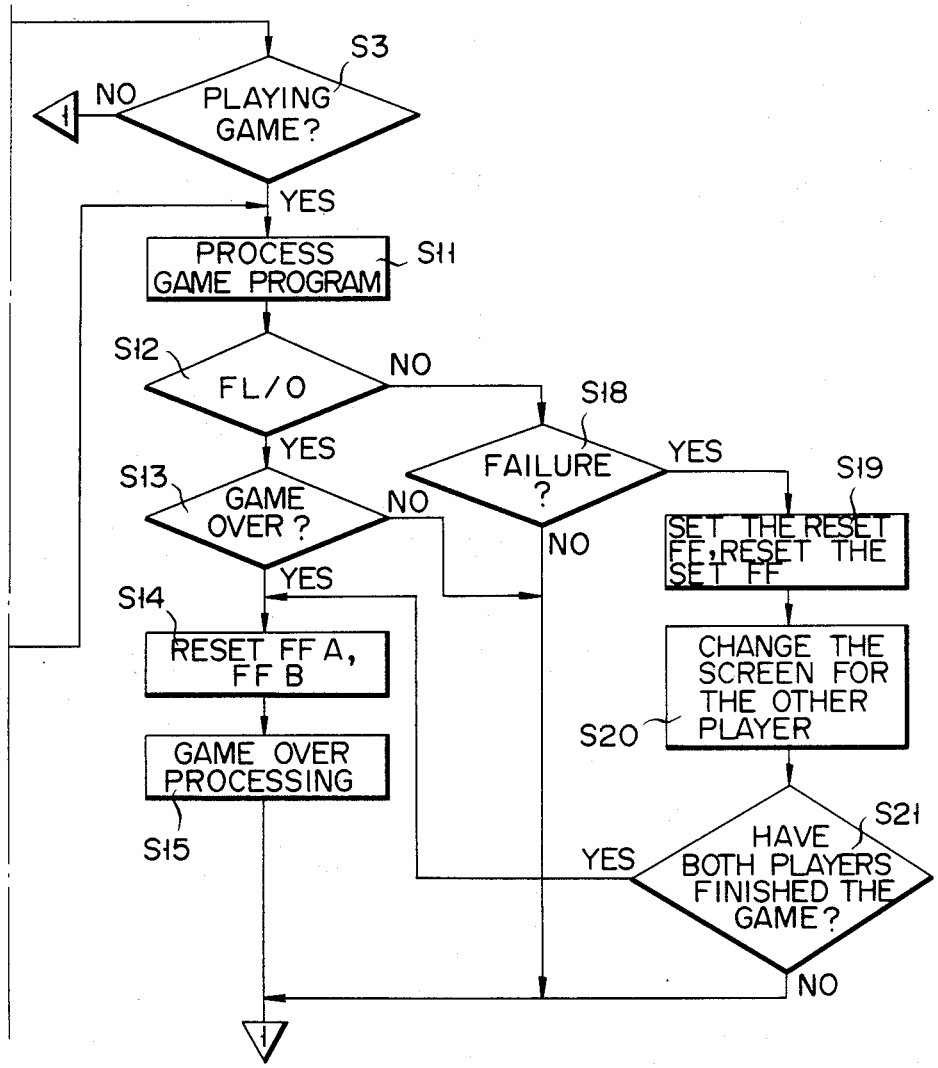

VIDEO GAME APPARATUS ALLOWING FOR A VARIATION IN PLAYING SEQUENCE

BACKGROUND OF THE INVENTION

The present invention relates to a video game apparatus which plays a game in either a one-player mode or a two-player mode as desired.

The general video game apparatus of the prior art is provided with a pair of joysticks, one for one player and the other for the other player. To play a game, the players individually operate the joysticks to score points, for example. The player who gains the most points wins the game. In some games, a mode select switch is operated to swtich the operation mode of the video game apparatus from a two-player mode to a one-player mode. Then, one player can enjoy playing a game by himself by operating a single joystick. In the prior game apparatus, the operating order of the joy joysticks connected to the main frame of the game apparatus is inflexible. For example, a first joystick must be connected to a first terminal of the main frame, and a second joystick, to a second terminal. To prevent a wrong connection, differently configured connectors are used for the terminals. As for which joystick is operated first, that is determined by design. Therefore, it is impossible to change the operating order after the game apparatus is manufacture. Because of the restricted operating order, before the game apparatus can be operated in the two-player mode, the first player must be determined. In the one-player mode, after one of the joysticks is selected, it can not be switched, even if the selected one is broken down. In such a case, there is no way to continue the game further.

SUMMARY OF THE INVENTION

Accordingly, the present invention has an object to provide a video game apparatus improved in operability, in that the operation order of the two joysticks is reversible by switching an operation mode of the game apparatus between the one-player mode and the two-player mode.

According to the present invention, there is provided a video game apparatus comprising a main frame of the video game apparatus, input means having first and second joysticks, mode specifying means for selectively specifying either a first mode in which a game is played by one player or a second mode in which the game is played by two players, control means respectively connected to the first joystick and the second joystick, thereby controlling the input to the main frame, game executing means coupled to the mode specifying means and to the control means to execute the game according to a specified mode and to supply a control signal to the control means, and display means coupled to the game executing means to visually display the results of the game.

With such an arrangement, when the one-player mode is selected, only the output signal from the joystick whose start key is operated is effective. When the two-player mode is selected, the output signal from the joystick whose start key is first operated is connected to the main frame of the video game apparatus, thereby starting the game. As the game progresses, the output signals from the first and second joysticks are alternately connected to the main frame. Therefore, the joysticks as well as the connectors may take the same physical configuration. The result is that any restriction in their connections or in the operation order is eliminated. In this respect, the operability of the video game apparatus is remarkably improved.

BRIEF DESCRIPTION OF THE DRAWING

FIGS. 3A and 3B show the control flows of the operation of the video game apparatus of FIG. 1.

DETAILED DESCRIPTION OF THE PREFERRED EMBODIMENTS

Figure 1:
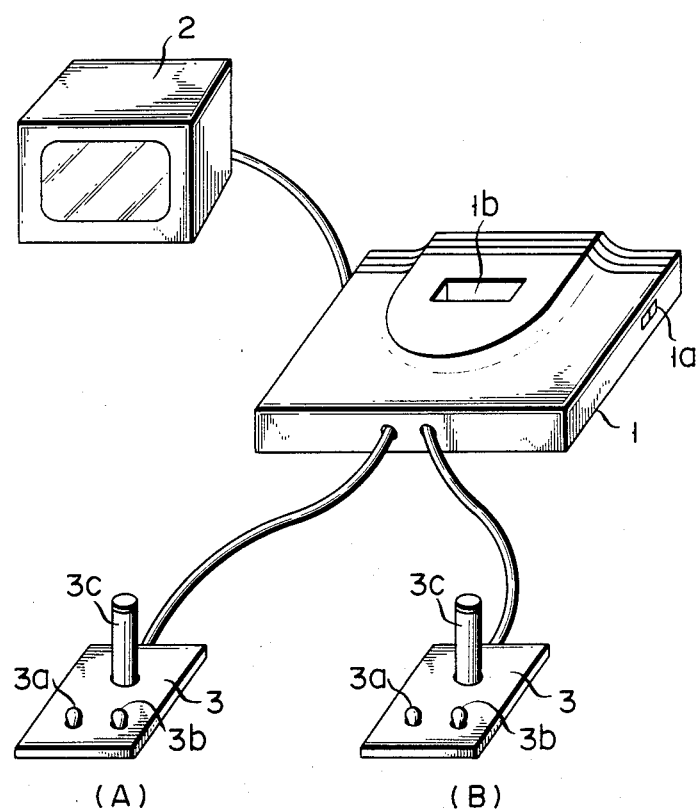
FIG. 1 illustrates a system configuration of a video game apparatus which is an embodiment of the present invention.

A video game apparatus incorporating the present invention may be as shown in FIG. 1. As shown, a main frame 1 of the video game apparatus which plays a game is connected to a television set 2 and to a pair of joysticks 3 and 3 distinguished as A and B. Connectors (not shown) are used for the connection of those components.

The main frame 1 is provided with a power switch 1a and a receptable 1b for receiving a ROM pack storing a game program (not shown). Each of the joysticks 3 and 3 is provided with a select key 3a for selecting either a one-player mode or a two-player mode, a start key 3b for starting the game, and a stick 3c for moving an object on the screen in many directions, for example, right, left, up, down, and oblique. The joysticks 3 and 3 have the same configuration and may be connected to either connector of the main frame 1.

Figure 2:
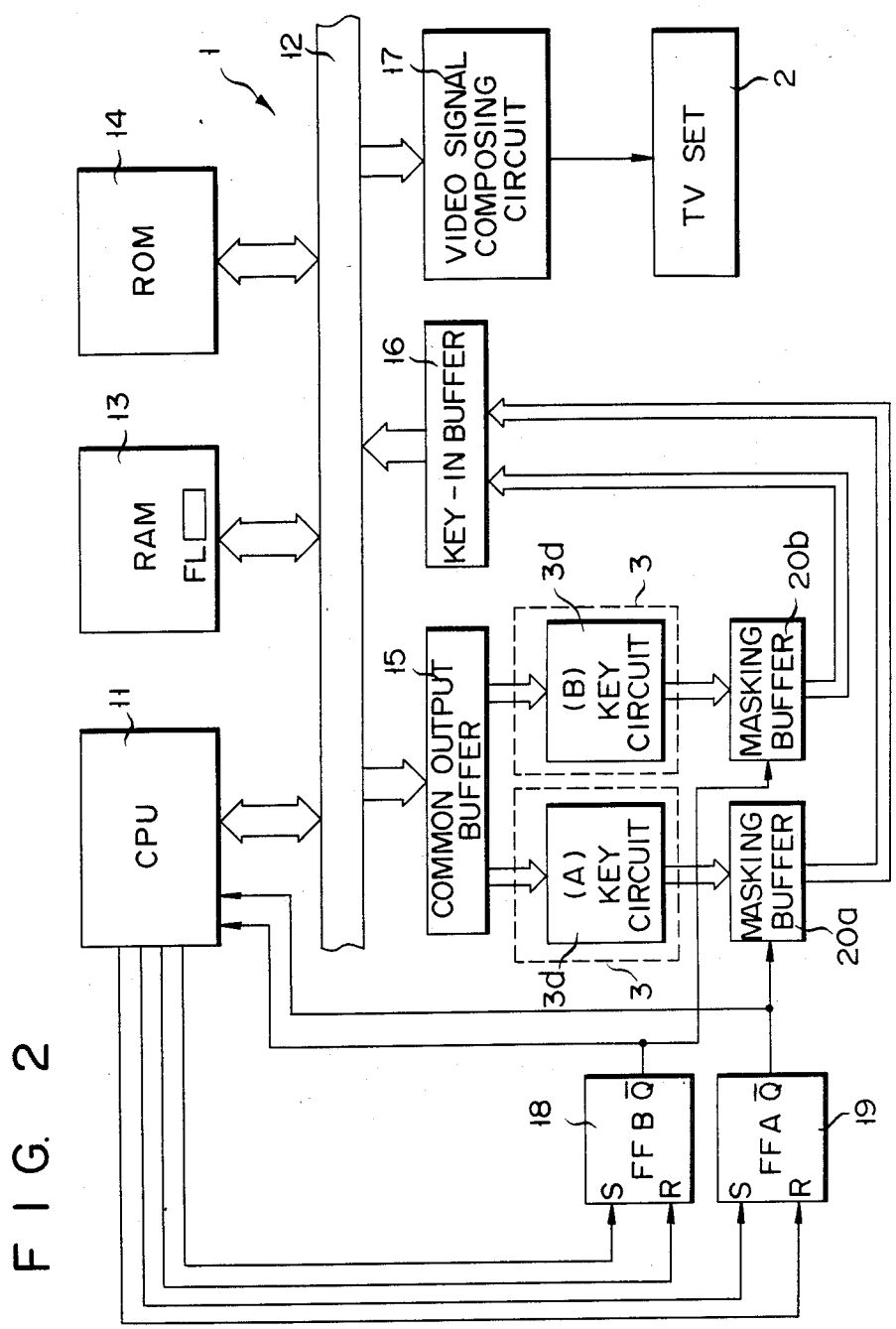
FIG. 2 is a block diagram of the video game apparatus shown in FIG. 1.

FIG. 2 shows a configuration of a circuit contained in the main frame 1, including reference numeral 1 designates processing unit). A RAM 13, a ROM 14, a buffer 15 for common output, a buffer 16 for key in, and a video composing circuit 17 are interconnected through a bus 12.

The output signals from the CPU 11 are applied to set input terminal S
and reset input terminal R
of a flip-flop (FFB) 18 and to
set input terminal S and
reset input terminal R of a flip-flop(FFA) 19 respectively. The output signals from the reset output terminals Q are connected to the CPU 11.

The RAM 13 includes a text area for saving a table, a work area made up of an operation register, an area for saving character codes, and another area made up of an FL register for storing the mode, the one-player mode or the two-player mode, selected by the select key 3a of the joystick 3. "FL=0" indicates selection of the one-player mode, and "FL=1," the two-player mode.

The ROM 14 is a ROM pack storing a game program and a character generator, and is set into the receptacle 1b.

The buffer 15 temporarily stores sampling data applied as a sampling signal to key circuits 3d and 3d as fixed contacts (not shown) of the keys 3a, 3b and of the stick 3c provided in the joystick 3, in order to detect the operation of the keys and the stick. The sampling data is sequentially fed from the CPU 11.

The output signal from the key circuits 3d and 3d is respectively applied through the masking buffers 20a and 20a to a buffer 16 for keying in. The output signal is temporarily stored in the buffer 16 and then is applied to the CPU 11 through the bus 12.

The input terminals of the buffers 20a and 20b are respectively coupled with the reset terminals $\bar{Q}$. Only when "1" appears at the terminal $\bar{Q}$, that is, only when the flip-flop 19 or 18 is in a reset state, does it read the output of the corresponding key circuit 3d. The results of the game through a combination of the CPU 11, the RAM 13 and the ROM 14 are applied through the bus 12 to the video composing circuit 17. In the video composing circuit 17, the results are transformed as a video signal which is visually displayed by the television set 2.

Figure 3A:
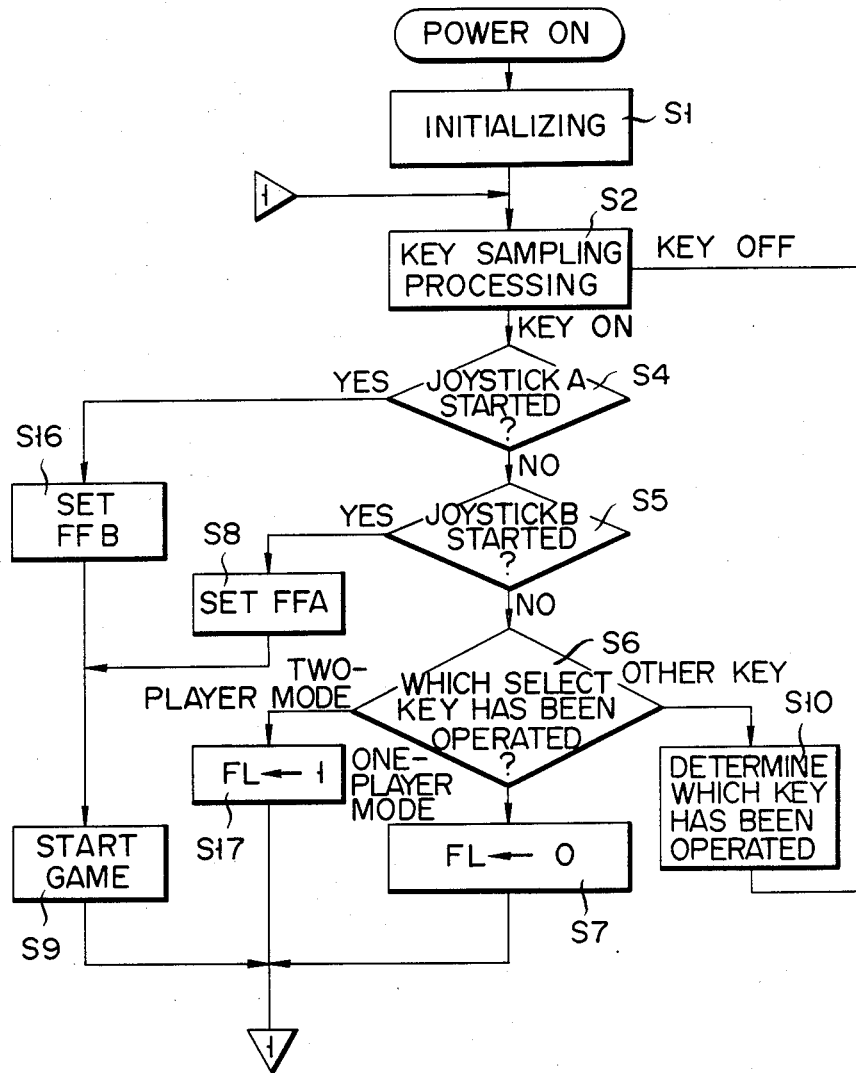

The operation of the video game apparatus thus arranged will be given referring to FIGS. 3A & 3B. The main flow of the operation is power on; mode selection, i.e. one-player mode or two-player mode; operation of start key 3b; execution of game; and game over.

A one-player mode as selected by the select key 3a will first be given. When the power is on, the CPU 11 executes step S1 where the flip-flops 18 and 19 are reset, and where the initial values are set in various types of resistors and flags. Then, step S2 is executed. In this step S2, sampling data transferred from the CPU 11 is sequentially updated, and it is judged whether or not the keys and the stick, 3a, 3b and 3c are operated. If no key operation is detected, the program flows to step S3. In this step, it is judged whether or not a game is actually being played following the start of the game. If the game is not being played, the program returns to step S2, and repeats steps S2 and S3 until the key is operated.

At this time, if the select key 3a is operated for a one-player mode, in step S2 this state is judged as "key on" and step S4 is executed. In step S4, it is judged whether or not the start key 3b of the joystick A has been operated. Since the key operated at this time is the select key 3a, "NO" is produced and the program advances to step S5.

Step 5 likewise judges whether or not the start key 3b of the joystick B is operated or not. Therefore, "NO" is produced and the CPU 11 executes step S6. In this step S6, it is judged which mode, the one-player mode or the two-player mode, has been seleted by the select key 3a and whether or not the other key has been operated. At present, since the one-player mode has been selected, the CPU 11 executes step S7 and loads "0" into the FL register of the RAM 13. Then, it executes step S2 again and continues the key sampling until the next key operation is performed.

Let us assume that the joystick B is used for playing the game, and that the start key 3b thereof is operated. The program flows through step S4 to step S5. In step S5, "YES" is given. Therefore, the CPU 11 sends a set signal to the set input terminal S of the flip-flop (FFA) 19; the FFA 19 is set as shown in step S8, and then flows to step S9. At this point, a game start mode for the one-player mode is completed.

After the start of the game, the player operates the stick 3c of the joystick B or a shooting button (not shown) to play the game. Upon operation of the stick or button, the program jumps from step S6 to step S10. In step S10, it is judged in what direction the stick 3c is turned or whether or not the shooting button is pushed. Next, in step S11, game processing such as change of the picture on the screen and the addition of scored points is executed on the basis of the judment results.

After completion of step S11, step S12 is executed to determine whether FL is "0" or not, viz., the selected mode is the one-player mode or the two-player mode. Since the present mode is the one-player mode, "FL=0" and step S13 is executed. In this step S13, it is judged whether or not the game under execution is over. If the result of the judgement is "NO," step S2 is again executed and the game is continued. If it is "YES," step S14 is executed. In this step S14, the flip-flop (FFB) 18 and the flip-flop (FFA) 19 are reset or initialized. Next, step S15 is executed. This step S15 displays the end of the game or the total of scored points on the screen of the television set 2. After completion of this step, the program returns to step S2 and the video game apparatus is ready for the next game.

As described above, if the start key 3b of the joystick B is pushed, the flip-flop (FFA) 19 is set and disables the buffer 20a in reading the sampling data from the key circuit 3d. Under this condition, nothing is input if the joystick A is operated in any way.

On the other hand, if the start key 3b of the joystick A is pushed at the start of the game, the program execution jumps from step S4 to S16. In this step, the flip-flop (FFB) 18 is set and the reading operation by the buffer 20b is made inoperative to inhibit inputting by the joystick B.

A two-player mode as set by the select key 3a will be described. Power is first turned on. When a game to be played is a new one, the CPU 11 executes the key sampling processing of step S2 through step S1. When the game is the same as before, the CPU 11 executes the processing that follows step S15. When the select key 3a is operated to set up the two-player mode, the CPU 11 executes steps S4, S5 and S6 in that order. In step S6, the two-player mode is confirmed, and the program execution step of step S6 jumps to step S17. In this step, "1" is loaded into the FL register of the RAM 13. If it is desired to first operate joystick B to play the game, the start key 3b of the joystick B is operated. Then, the program is sequentially executed in the route of steps S4, S5, S8 and S9, and the game starts.

Subsequently, in response to operating the stick 3c of the joystick B or the shooting button, steps S10 and S11 are sequentially executed, as in the previous case. In step S12, "NO" is given then FL=1 at present and since step S18 is executed.

In this step S18, it is judged whether or not the video game apparatus has failed due to the fact that the operation of the stick 3c of the joystick B fails to follow the motion of the object on the screen. If the result of the judgment is "NO," the CPU 11 returns to step S2, thereby allowing the game to continue to be played by operating the stick 3c of the joystick B. On the other hand, if the result is "YES," the CPU 11 goes to step S19 to change the state of the flip-flop (FFB) 18 from the reset state to the set state, and to change the state of the flip-flop (FFA) 19 from the set state to the reset state. Then, the other player gains the right to operate the joystick. Then, step S20 is executed to change the screen for the other player. Since in step S19, the flip-flop (FFB) 18 is set, the buffer 20b is made inoperative in the reading operation. On the other hand, because the flip-flop (FFA) 19 is reset, the buffer 20a is placed in a read permission state. Accordingly, the game may be continued using the joystick A.

Subsequently, the game is continuously played alternately by both players, going back and forth between joystick B and joystick A until the game is over. When both the players finish their games, the program jumps back from step S21 to step 14. Then, the flip-flops 18 and 19 are reset and the video game apparatus stands ready for the next game.

If the start key 3b of the joystick A is pushed at the start of the game, the order of playing the game by the players is reversed going back and forth between joystick A and joystick B. The operation by the CPU 11 is performed as in the previous manner.

In the two-player mode, the game is started by the player who first pushes the start key. At this time, the operation of the joystick of the other player is void.

While in the above-mentioned embodiment, the select key 3a is mounted to the joystick 3, it may also be mounted to the main frame 1 of the video game apparatus.

Provision of the two flip-flops for masking the outputs of the joysticks 3 and 3, may be replaced by raising masking flags in the RAM. As described above, the output signals of the key circuits 3d are controlled by the masking buffers 20a and 20b, respectively. Alternatively, the input signals to the key circits 3d and 3d may be masked by controlling the output signals from the buffer 15.

It should be understood that the present invention may be variously changed and modified within the scope of the present invention.

What is claimed is:

1. A video game apparatus, comprising:
   a main frame for receiving operating inputs;
   input means including first and second joysticks each having a start key;
   mode specifying means for selectively specifying either one of a first mode in which a game is played by one player and a second mode in which the game is played by two players, wherein said mode specifying means includes a RAM containing an FL register for storing a flag corresponding to the specified mode;
   control means adapted to be connected to said first joystick and said second joystick, respectively, for controlling the inputs to said main frame and including a first means to control the video game apparatus in its first mode so that only an output signal from the one of said first and second joysticks whose start key is first operated is input to said main frame,
   and wherein said first and second joysticks are both capable of being operated in said first mode,
   and second means to control the video game apparatus in its second mode so that an output signal of the one of said first and second joysticks whose start key is first operated is input to said main frame for starting the game and, during progression of the game, output signals from said first and said second joysticks are alternately input to said main frame;
   game executing means coupled to said mode specifying means and to said control means to execute the game according to the specified mode and to supply control signals to said control means; and
   display means coupled to said game executing means to display visually the results of the executed game.

2. The video game apparatus according to claim 1, in which said first and said second joysticks in said input means each contain a stick for specifying the direction of motion of an object on a screen and a mode select key for selecting either of said modes.

3. The video game apparatus according to claim 1, in which said control means includes a first control circuit for controlling the output signals from said first joystick, comprising a flip-flop circuit and a buffer memory, and a second control circuit for controlling the output signals from said second joystick, which includes a flip-flop circuit and a buffer memory.

4. The video game apparatus according to claim 1, in which said game executing means includes a CPU, RAM, and ROM connected to said input means through a bus.

5. The video game apparatus according to claim 1, in which said display means is a cathode ray tube (CRT).

* * * * *